(12) United States Patent
Marble

(10) Patent No.: US 11,807,061 B2
(45) Date of Patent: Nov. 7, 2023

(54) VARIABLE ADAPTIVE HYDRO-MECHANICAL SPRING

(71) Applicant: GM Global Technology Operations LLC, Detroit, MI (US)

(72) Inventor: Robert Patrick Marble, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/688,238

(22) Filed: Mar. 7, 2022

(65) Prior Publication Data

US 2023/0278383 A1    Sep. 7, 2023

(51) Int. Cl.
| | |
|---|---|
| B60G 17/016 | (2006.01) |
| B60G 17/08 | (2006.01) |
| B60G 17/027 | (2006.01) |
| B60G 17/052 | (2006.01) |

(52) U.S. Cl.
CPC ....... *B60G 17/0162* (2013.01); *B60G 17/027* (2013.01); *B60G 17/0523* (2013.01); *B60G 17/08* (2013.01); *B60G 2202/30* (2013.01); *B60G 2204/62* (2013.01); *B60G 2500/104* (2013.01); *B60G 2800/24* (2013.01); *B60G 2800/91* (2013.01)

(58) Field of Classification Search
CPC  B60G 17/0162; B60G 17/27; B60G 17/0523; B60G 17/08; B60G 2800/24; B60G 2204/62
USPC ........................................... 280/5.506, 5.507
See application file for complete search history.

(56) References Cited

U.S. PATENT DOCUMENTS

| | | | | |
|---|---|---|---|---|
| 7,162,945 | B2* | 1/2007 | Tatsuya | B60G 17/0162 91/441 |
| 8,434,771 | B2* | 5/2013 | Yu | F16F 9/46 280/124.16 |
| 9,090,141 | B2* | 7/2015 | Schmidt | B60G 11/26 |
| 9,174,508 | B2* | 11/2015 | Anderson | B60G 17/016 |
| 10,035,400 | B2* | 7/2018 | Marble | B60G 17/02 |
| 2020/0223274 | A1* | 7/2020 | Tucker | B60G 11/56 |

FOREIGN PATENT DOCUMENTS

| | | |
|---|---|---|
| DE | 19950161 A1 | 5/2001 |
| DE | 102017116575 A1 | 2/2018 |

OTHER PUBLICATIONS

DE Office Action for Serial No. 102022126463.7 dated May 25, 2023, 5 pages.

\* cited by examiner

*Primary Examiner* — James A English
*Assistant Examiner* — Caitlin Anne Miller
(74) *Attorney, Agent, or Firm* — CANTOR COLBURN LLP

(57) ABSTRACT

A vehicle, variable spring system and method of operating a corner actuator coupled to wheel of the vehicle. The vehicle includes the corner actuator and the variable spring system. The variable spring system includes a control chamber coupled to the corner actuator, a first spring, a second spring, and a valve. An applied resistance for the corner actuator is selected by selecting an amount of fluid coupling between the control chamber and each of the first spring and the second spring. A force is absorbed at the wheel using the applied resistance.

19 Claims, 4 Drawing Sheets

VARIABLE ADAPTIVE HYDRO-MECHANICAL SPRING

INTRODUCTION

The subject disclosure relates to spring systems in vehicles and, in particular, to a system and method for adapting an alternate spring constant upon request.

A spring in a vehicle suspension operates by providing a resistance to displacement relative to position to define a spring rate. A spring rate (is related to a spring constant) and indicates a primary stiffness of a suspension system which will define the performance and character of a vehicle's ride and handling. Traditional springs are fixed or may provide variable rate with displacement. Spring rates are often optimized for performance of a system, whereas a stiff spring will provide improved handling, and a softer spring will provide better ride quality. Accordingly, it is desirable to provide a spring system having rates that can be adjusted to enable fixed alternate vehicle modes (e.g., sport mode, ride mode, off-road mode), and/or dynamic rate adjustment to improve handling in a vehicle without compromising the ride associated with traditionally softer spring rates.

SUMMARY

In one exemplary embodiment, a method of operating a corner actuator coupled to a wheel of a vehicle is disclosed. An applied resistance for the corner actuator is selected by selecting an amount of fluid coupling between a control chamber of a variable spring system and each of a first spring and a second spring, wherein the corner actuator is in fluid communication with the control chamber. A force is absorbed at the wheel using the applied resistance.

In addition to one or more of the features described herein, the first spring provides a first resistance and the second spring provides a second resistance, and the amount of fluid coupling is selected to provide the applied resistance that is one of the first resistance, the second resistance, and a third resistance between the first resistance and the second resistance. The method further includes controlling a position of a valve to select the amount of fluid coupling. The method further includes controlling the position of the valve to compensate for at least one of a roll of the vehicle and a pitch of the vehicle. The position of the valve determines a first size of a first aperture between the first spring and the control chamber and a second size of a second aperture between the second spring and the control chamber. The method further includes controlling a fluid volume in the variable spring system. At least one of the first spring and the second spring is selected from a spring pack, a hydraulic spring, a pneumatic device, and a coil spring.

In another exemplary embodiment, a variable spring system for a vehicle is disclosed. The spring system includes a control chamber coupled to a corner actuator of the vehicle, a first spring, a second spring, and a valve configured to select an applied resistance at the corner actuator by controlling an amount of fluid coupling between the control chamber and each of the first spring and the second spring.

In addition to one or more of the features described herein, the first spring provides a first resistance and the second spring provides a second resistance and the valve is configured to control the amount of fluid coupling to provide the applied resistance at the corner actuator that is one of the first resistance, the second resistance, and a third resistance between the first resistance and the second resistance. The variable spring system further includes a solenoid configured to control a configuration of the valve. The variable spring system further includes a processor to control the configuration of the valve via the solenoid to compensate for at least one of a roll of the vehicle and a pitch of the vehicle. The configuration of the valve determines a first size of a first aperture between the first spring and the control chamber and a second size of a second aperture between the second spring and the control chamber. The variable spring system further includes a pump configured to control a fluid volume in the variable spring system. At least one of the first spring and the second spring is selected from a spring pack, a hydraulic spring, a pneumatic device, and a coil spring.

In yet another exemplary embodiment, a vehicle is disclosed. The vehicle includes a corner actuator and a variable spring system. The variable spring system includes a control chamber coupled to the corner actuator, a first spring, a second spring, and a valve configured to select an applied resistance at the corner actuator by controlling an amount of fluid coupling between the control chamber and each of the first spring and the second spring.

In addition to one or more of the features described herein, the first spring provides a first resistance and the second spring provides a second resistance and the valve is configured to control the amount of fluid coupling to provide the applied resistance at the corner actuator that is one of the first resistance, the second resistance, and a third resistance between the first resistance and the second resistance. The vehicle further includes a solenoid configured to control a configuration of the valve. The vehicle further includes a processor to control the configuration of the valve via the solenoid to compensate for at least one of a roll of the vehicle and a pitch of the vehicle. The vehicle further includes a pump configured to control a fluid volume in the variable spring system. At least one of the first spring and the second spring is selected from a spring pack, a hydraulic spring, a pneumatic device, and a coil spring.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
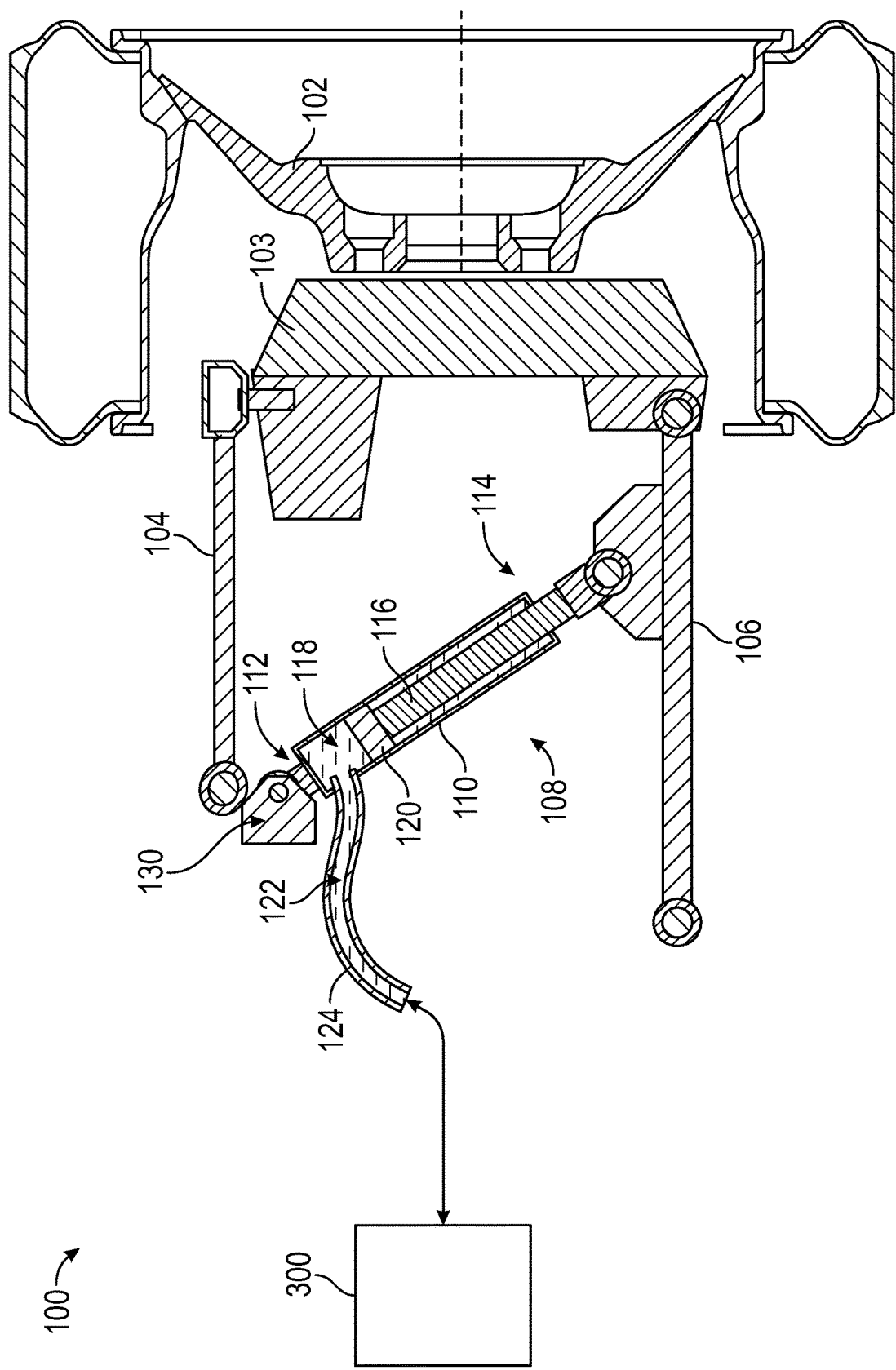
FIG. 1 shows a side sectional view of a wheel assembly of a vehicle, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a side sectional view of a wheel assembly 100 of a vehicle. The wheel assembly 100 includes a wheel 102, a hub 103, an upper control arm 104 coupled to a top end of the hub and a lower control arm 106 coupled to a bottom end of the hub. The wheel assembly 100 further includes a corner actuator 108. The corner actuator 108 includes a cylindrical sleeve 110 that extends from a first end 112 to a second end 114. The cylindrical sleeve 110 is closed at the first end 112 and open at the second end 114. The cylindrical sleeve 110 is coupled at the first end 112 to a fixed point on the vehicle structure 130. A piston rod 116 extends into the cylindrical sleeve 110 at the second end 114 and is and movable within the cylindrical sleeve. The piston rod 116 is coupled to the lower control arm 106. A hydraulic chamber 118 is formed within the cylindrical sleeve 110 between a piston 120 of the piston rod 116 and the first end 112. A fluid 122 is disposed within the hydraulic chamber 118 between the first end 112 and the piston 120. A conduit 124, such as a hose, connects to the hydraulic chamber 118 at or near the first end 112 of the cylindrical sleeve 110. As the lower control arm 106 and vehicle structure 130 move toward each other, the piston rod 116 and piston 120 move toward the first end 112, reducing the volume of the hydraulic chamber 118 and pushing the fluid 122 out of the chamber via the conduit 124 and into a variable spring system 300, which is discussed in detail with respect to FIG. 3. As the lower control arm 106 and vehicle structure 130 move away from each other, the piston rod 116 and piston 120 move toward the second end 114, increasing the volume of the hydraulic chamber 118 and drawing the fluid 122 from the variable spring system 300 and into the chamber via the conduit 124. The distance between the lower control arm 106 and vehicle structure 130 is generally a function of a force between the wheel 102 and a road surface. The hydraulic force provided by the corner actuator 108 provides a vertical resistance against any vertical force experienced at the wheel 102.

Figure 2:
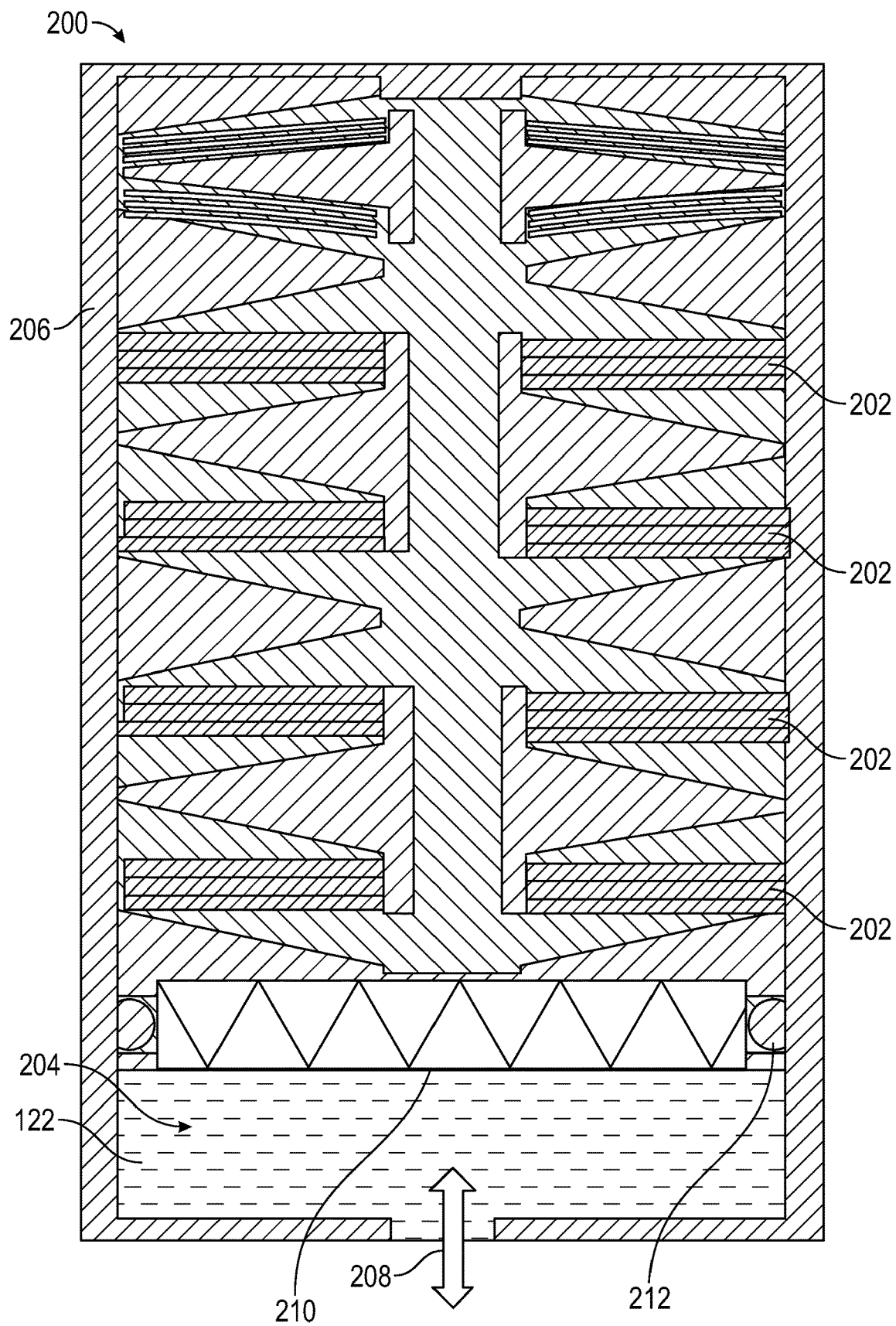
FIG. 2 shows a spring pack, in an illustrative embodiment.

FIG. 2 shows a spring pack 200, in an illustrative embodiment. The spring pack 200 is a hydro-mechanical device that includes a plurality of circular springs or discs 202 arranged in a manner similar to Belleville washers. The discs 202 are disposed in a chamber 204 formed within a housing 206. The housing 206 has an aperture 208 through which a fluid 122 can flow into and out of the chamber 204, the fluid being the same fluid shown in FIG. 1. A separating piston 210 with sealing O-Ring 212 translates the fluid displacement into chamber 204 into a linear displacement of the spring discs. In various embodiments, the aperture 208 is located at a bottom or lowermost point of the housing 206. The spring pack 200 is defined by a spring constant. This spring constant can be linear or progressive depending on the configuration of the discs in the spring pack 200. When fluidly connected to the corner actuator 108, the spring pack 200 provides a resistance that is dependent on the volume of the fluid 122 within the housing 206 and thus on the deflection of discs 202 compressed by the fluid displacement into the housing 206.

Figure 3:
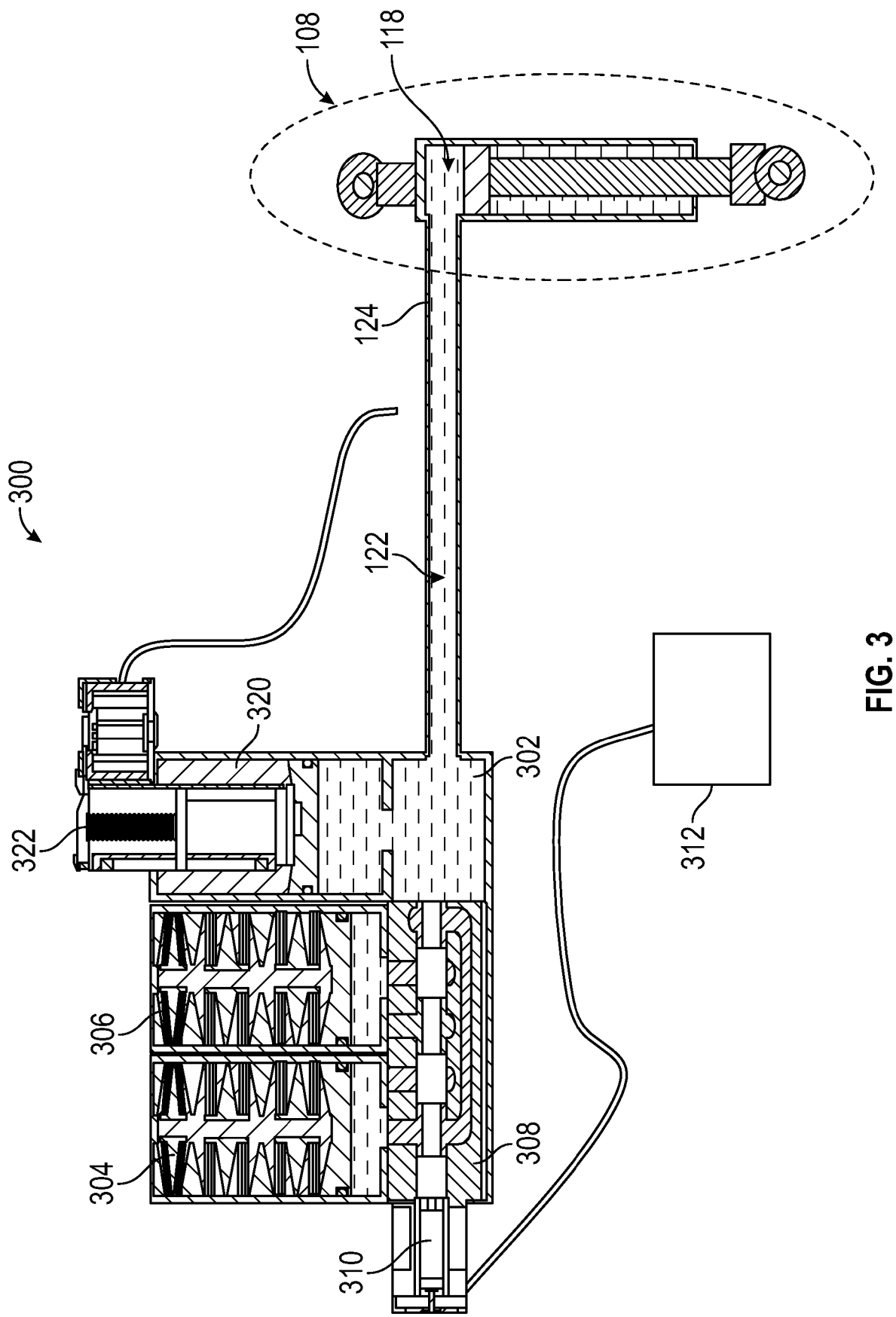
FIG. 3 shows a variable spring system for adjusting a spring constant experienced at a corner actuator, in an illustrative embodiment.

FIG. 3 shows a variable spring system 300 for adjusting a spring constant experienced at the corner actuator 108 of FIG. 1, in an illustrative embodiment. The variable spring system 300 is coupled to the hydraulic chamber 118 of the corner actuator 108 via the conduit 124. The variable spring system 300 includes a control chamber 302, a first spring 304 and a second spring 306. In an embodiment, each of the first spring 304 and the second spring 306 are disposed in their respective housings, each of which includes a fluid that can be used to couple the respective first spring 304 and second spring 306 to the control chamber 302. At least one of the first spring 304 and the second spring 306 can act as a spring pack 200, such as shown in FIG. 2. In other embodiments, at least one of the first spring 304 and the second spring 306 can be any suitable hydraulic device such as a hydraulic spring, a pneumatic device or a coil spring. The control chamber 302 is fluidly coupled to the hydraulic chamber 118 via the conduit 124. The control chamber 302 includes a valve 308 that controls an amount or a degree of fluid coupling between the control chamber 302 and each of the first spring 304 and the second spring 306.

An actuation device 310 such as a solenoid can be used to set the valve 308 at one of a plurality of valve positions or valve configurations. A processor 312 is in communication with the actuation device 310 and controls operation of the actuation device 310, thereby controlling the configuration of the valve 308. Each position or configuration of the valve 308 provides a selected ratio for coupling of the control chamber 302 to each of the first spring 304 and the second spring 306. The valve 308 enables the static selection of an individual spring rate (or spring constant), or a combined spring rate (1/k) (or combined spring constant) for both. In this way, the spring rate can be a first spring rate based on actuation of the first spring 304, a second spring rate based on actuation of the second spring 306 or a third spring rate based on actuation of both the first spring and the second spring together. Dynamically, the spring rate can be switched from one rate to another.

The spring constant $k_{ca}$ experienced at the corner actuator 108 can be written as a combination of the first spring constant $k_1$ and the second spring constant $k_2$. The spring constant $k_{ca}$ can be arrived at by considering the first spring and the second spring as being in series. The spring constant $k_{ca}$ is therefore as shown in Eq.

$$k_{ca} = \left(\alpha \frac{1}{k_1} + (1-\alpha)\frac{1}{k_2}\right)^{-1} \quad \text{Eq. (1)}$$

where a is a proportion where a is a ratio of a fluid coupling between the control chamber 302 and the first spring 304 to the fluid coupling between the control chamber 302 and both springs. Thus, 1-a is the ratio of the amount of a fluid coupling between the control chamber 302 and the second spring 306 to the fluid coupling between the control chamber 302 and both springs. The amount of fluid coupled between the control chamber and a spring is related to a size of the aperture or opening between the control chamber and the spring. Therefore, the proportion a is based on a first size of the first aperture of the first spring 304 and a second size of the second aperture of the second spring 306, which is controlled by the configuration of the valve 308. The processor 312 can control the valve configuration dynamically to compensate for various vehicle dynamics, such as to compensate for a roll or a pitch of the vehicle.

In a first valve configuration, for example, the first spring 304 is fluidly coupled to the control chamber 302 and the second spring 306 is fluidly isolated from the control chamber 302 (i.e., a=1). Therefore, the spring constant $k_{ca}$ experienced at the corner actuator 108 for the first valve configuration is the first spring constant $k_1$ of the first spring 304 and an applied resistance at the corner actuator is equal to a first resistance supplied by the first spring 304.

In a second configuration, the first spring 304 is fluidly isolated from the control chamber 302 and the second spring 306 is fluidly coupled to the control chamber 302 (i.e., a=0). Therefore, the spring constant $k_{ca}$ experienced at the corner actuator 108 for the second valve configuration is the second spring constant $k_2$ of the second spring 306 and an applied resistance at the corner actuator is equal to a second resistance supplied by the first spring 304.

In a third configuration, the first spring 304 and the second spring 306 are both fluidly coupled to the control chamber 302 (i.e., 0<a<1). The spring constant $k_{ca}$ experienced at the corner actuator 108 is therefore at a combination of the first spring constant and the second spring constant and an applied resistance at the corner actuator is equal to a third resistance that is a combination of the first resistance and the second resistance.

The variable spring system 300 further includes a pump chamber 320 in fluid communication with the control chamber 302. A pump 322 in the pump chamber 320 controls a fluid volume in the pump chamber 320 and thus throughout the variable spring system 300. The fluid volume can be increased or decreased in order to adjust the fluid volume within the control chamber 302 and hydraulic chamber 118. Increasing or decreasing the fluid volume further adjusts a ride height of the vehicle.

Figure 4:
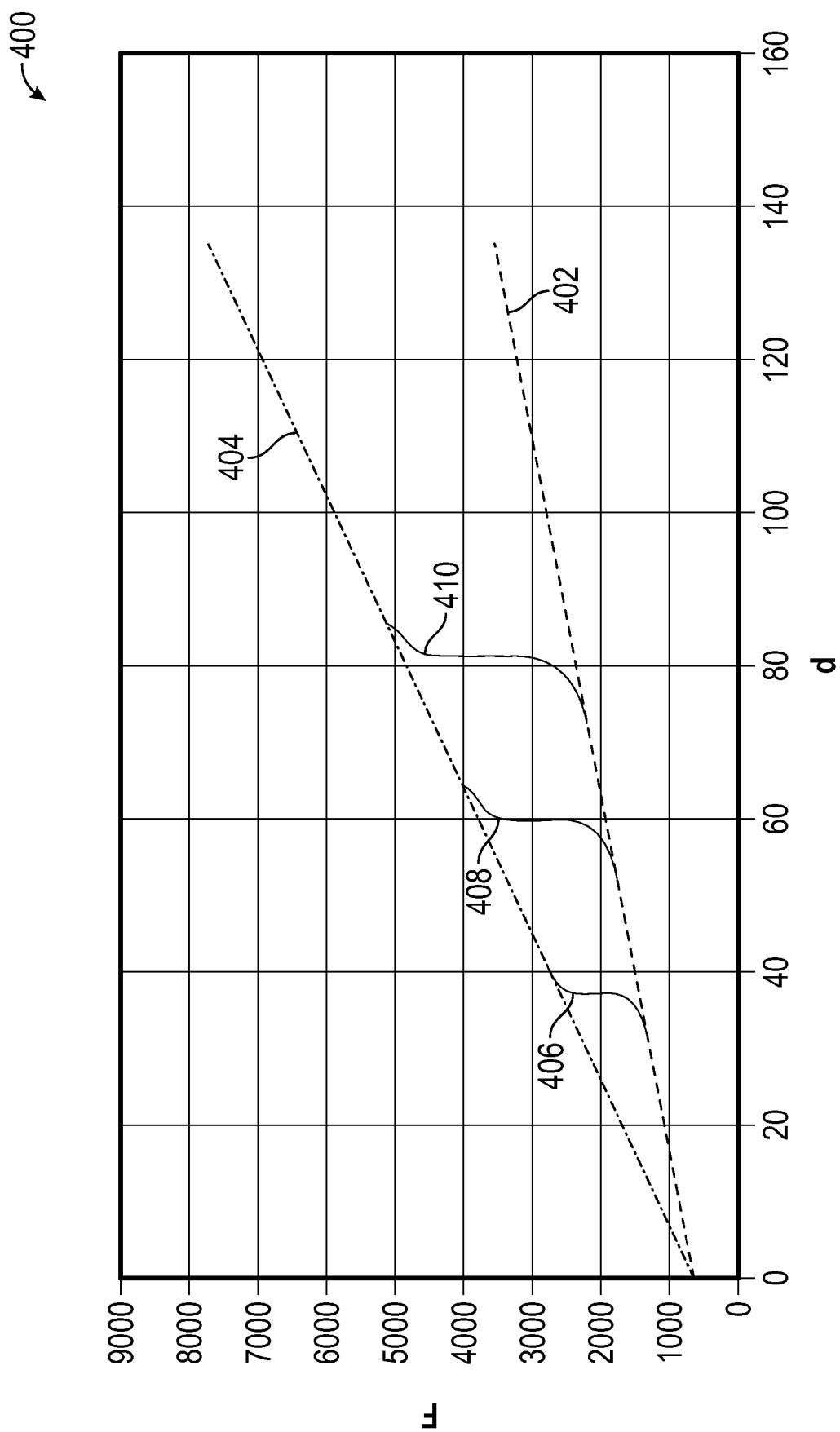
FIG. 4 shows a graph illustrating the effect of a valve configuration on the spring constant experienced at the corner actuator.

FIG. 4 shows a graph 400 illustrating the effect of valve configuration on the spring constant $k_{ca}$ experienced at the corner actuator. Wheel displacement (d) is shown along the abscissa and force (F) is shown along the ordinate axis. In an embodiment, the displacement can be in millimeters (mm) and the force can be in Newtons (N). A first curve 402 shows a linear relationship between the displacement at the wheel and the resistance force provided by the first spring 304. A slope of the first curve 402 indicates the first spring constant $k_1$ of the first spring 304. A second curve 404 shows a linear relationship between the displacement at the wheel and the resistance force provided by the second spring 306. A slope of the second curve 404 indicates the second spring constant $k_2$ of the second spring 306. As illustrated by the slopes of their respective curves in graph 400, the first spring constant is less than the second spring constant. Therefore, the first spring 304 provides a "soft" resistance while the second spring 306 provides a "hard" resistance.

Curves 406, 408 and 410 are provided to illustrate the effect of dynamically switching the valve 308 to a third configuration between the first valve configuration and the second valve configuration. Switching the valve dynamically from one mode to another can be done at any position in the travel and curves 406, 408 and 410 represent the capability of the spring to change as controlled by the processor to optimize for vehicle dynamics.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a corner actuator coupled to a wheel of a vehicle, comprising:
   selecting an applied resistance for the corner actuator by selecting a first size of a first aperture between a control chamber and a first spring and a second size of a second aperture between the control chamber and a second spring, wherein the corner actuator is in fluid communication with the control chamber; and
   absorbing a force at the wheel using the applied resistance.

2. The method of claim 1, wherein the first spring provides a first resistance and the second spring provides a second resistance, further comprising selecting the amount of fluid coupling to provide the applied resistance that is one of: (i) the first resistance; (ii) the second resistance; and (iii) a third resistance between the first resistance and the second resistance.

3. The method of claim 1, further comprising controlling a position of a valve to select the first size of the first aperture and the second size of the second aperture.

4. The method of claim 3, further comprising controlling the position of the valve to compensate for at least one of: (i) a roll of the vehicle; and (ii) a pitch of the vehicle.

5. The method of claim 1, further comprising controlling a fluid volume in the variable spring system.

6. The method of claim 1, wherein at least one of the first spring and the second spring is selected from: (i) a spring pack; (ii) a hydraulic spring; (ii) a pneumatic device; and (iv) a coil spring.

7. A variable spring system for a vehicle, comprising:
   a control chamber coupled to a corner actuator of the vehicle;
   a first spring coupled h a first aperture;
   a second spring coupled to the control chamber through a second aperture; and
   a valve configured to select an applied resistance at the corner actuator by selecting a first size of the first aperture and a second size of the second aperture.

8. The variable spring system of claim 7, wherein the first spring provides a first resistance and the second spring provides a second resistance and the valve is configured to control the amount of fluid coupling to provide the applied resistance at the corner actuator that is one of: (i) the first resistance; (ii) the second resistance; and (iii) a third resistance between the first resistance and the second resistance.

9. The variable spring system of claim 7, further comprising a solenoid configured to control a configuration of the valve.

10. The variable spring system of claim 9, further comprising a processor to control the configuration of the valve via the solenoid to compensate for at least one of: (i) a roll of the vehicle; and (ii) a pitch of the vehicle.

11. The variable spring system of claim 9, wherein the configuration of the valve determines the first size of the first aperture and the second size of the second aperture.

12. The variable spring system of claim 7, further comprising a pump configured to control a fluid volume in the variable spring system.

13. The variable spring system of claim 7, wherein at least one of the first spring and the second spring is selected from: (i) a spring pack; (ii) a hydraulic spring; (iii) a pneumatic device; and (iv) a coil spring.

14. A vehicle, comprising:
   a corner actuator; and
   a variable spring system comprising:
      a control chamber coupled to the corner actuator;
      a first spring coupled h a first aperture;
      a second spring coupled to the control chamber through a second aperture; and
      a valve configured to select an applied resistance at the corner actuator by selecting a first size of the first aperture and a second size of the second aperture.

15. The vehicle of claim 14, wherein the first spring provides a first resistance and the second spring provides a second resistance and the valve is configured to control the amount of fluid coupling to provide the applied resistance at the corner actuator that is one of: (i) the first resistance; (ii)

the second resistance; and (iii) a third resistance between the first resistance and the second resistance.

16. The vehicle of claim 14, further comprising a solenoid configured to control a configuration of the valve.

17. The vehicle of claim 16, further comprising a processor to control the configuration of the valve via the solenoid to compensate for at least one of: (i) a roll of the vehicle; and (ii) a pitch of the vehicle.

18. The vehicle of claim 14, further comprising a pump configured to control a fluid volume in the variable spring system.

19. The vehicle of claim 14, wherein at least one of the first spring and the second spring is selected from: (i) a spring pack; (ii) a hydraulic spring; (ii) a pneumatic device; and (iv) a coil spring.

* * * * *